US010689899B2

(12) United States Patent
Koster et al.

(10) Patent No.: US 10,689,899 B2
(45) Date of Patent: Jun. 23, 2020

(54) GASKET RAILING SYSTEM FOR A WINDOW FRAME

(71) Applicant: Matrex Window System Inc., Vaughan (CA)

(72) Inventors: Norman Koster, Richmond Hill (CA); Angelo Forgione, Woodbridge (CA)

(73) Assignee: MATREX WINDOW SYSTEM INC., Vaughan, Ontario (CA)

( * ) Notice: Subject to any disclaimer, the term of this patent is extended or adjusted under 35 U.S.C. 154(b) by 0 days.

(21) Appl. No.: 16/163,214

(22) Filed: Oct. 17, 2018

(65) Prior Publication Data

US 2020/0123840 A1   Apr. 23, 2020

(51) Int. Cl.
| | | |
|---|---|---|
| *E06B 1/36* | (2006.01) | |
| *E06B 3/12* | (2006.01) | |
| *B60J 1/00* | (2006.01) | |
| *B64C 1/14* | (2006.01) | |
| *B61D 25/00* | (2006.01) | |

(Continued)

(52) U.S. Cl.
CPC ............... *E06B 1/36* (2013.01); *E06B 3/12* (2013.01); *B60J 1/00* (2013.01); *B60J 10/70* (2016.02); *B61D 25/00* (2013.01); *B63B 19/00* (2013.01); *B63B 2019/0007* (2013.01); *B64C 1/14* (2013.01)

(58) Field of Classification Search
CPC . E06B 1/36; E06B 3/12; E04B 2/7425; E04B 2/7427; B60J 10/70; B60J 1/00; B63B 2019/0007; B63B 19/00; B61D 25/00; B64C 1/14

USPC ........... 52/204.1, 205, 206, 207, 210, 656.4, 52/656.5, 656.6

See application file for complete search history.

(56) References Cited

U.S. PATENT DOCUMENTS

| | | | | |
|---|---|---|---|---|
| 3,189,140 A | * | 6/1965 | Luss | E04B 2/76 52/204.597 |
| 3,593,963 A | * | 7/1971 | Horgan, Jr. | E04F 11/1851 256/24 |

(Continued)

FOREIGN PATENT DOCUMENTS

| | | | | |
|---|---|---|---|---|
| DE | 2061005 A1 | * | 6/1972 | ............ B60J 10/365 |
| DE | 3540961 A1 | * | 5/1987 | ............ B60J 10/265 |

(Continued)

OTHER PUBLICATIONS

Koster et al., U.S. Appl. No. 16/046,317, 680 pages.

(Continued)

*Primary Examiner* — Adriana Figueroa
(74) *Attorney, Agent, or Firm* — Baker & McKenzie LLP (57) ABSTRACT

Embodiments described herein may be directed towards a gasket railing system including a rail, such that the rail includes a rail gasket at least partially disposed within the rail and a leg insertion guide disposed within the rail gasket. The leg insertion guide may form a leg insertion cavity configured to receive a window frame leg. The rail gasket may be made up of a pliable material, and the leg insertion guide may be made up of a rigid material. The window frame leg may be attached to at least one side of a window frame made up of four window sides. The window frame may fully encase a window pane. A first horizontal width of at least one of the window frame sides may be greater than or equal to one half of a horizontal width of the rail.

19 Claims, 8 Drawing Sheets

(51) Int. Cl.
*B63B 19/00* (2006.01)
*B60J 10/70* (2016.01)

(56) References Cited

U.S. PATENT DOCUMENTS

| | | | | |
|---|---|---|---|---|
| 3,881,290 | A | | 5/1975 | Bouchey |
| RE28,643 | E | * | 12/1975 | Blum .................. E04F 11/1851 256/24 |
| 4,054,268 | A | * | 10/1977 | Sher ................... E04F 11/1812 256/24 |
| 4,067,548 | A | * | 1/1978 | Murphy .............. E04F 11/1851 256/24 |
| 4,074,490 | A | * | 2/1978 | Nagase .................... E06B 3/08 52/204.591 |
| 4,103,874 | A | * | 8/1978 | Horgan, Jr. .......... E04F 11/1853 256/24 |
| 4,115,972 | A | | 9/1978 | Varlonga |
| 4,599,838 | A | | 7/1986 | Kaminaga |
| 4,614,062 | A | | 9/1986 | Sperr |
| 4,754,585 | A | | 7/1988 | Rundo |
| 4,825,609 | A | | 5/1989 | Rundo |
| 4,913,976 | A | * | 4/1990 | Brooks .................. B32B 25/08 428/494 |
| 4,941,289 | A | | 7/1990 | Rolek |
| 5,105,593 | A | | 4/1992 | Kaminaga et al. |
| 5,212,922 | A | | 5/1993 | Werner |
| 5,544,457 | A | | 8/1996 | Labrecque |
| 5,618,127 | A | | 4/1997 | Tonsmann et al. |
| 5,635,274 | A | * | 6/1997 | Chihara .................. B60J 10/15 428/122 |
| 6,141,923 | A | | 11/2000 | Habicht et al. |
| 6,517,056 | B2 | * | 2/2003 | Shepherd ............ E04F 11/1851 256/24 |
| 6,662,512 | B2 | | 12/2003 | Westphal |
| 8,181,405 | B2 | * | 5/2012 | Nash ................... E04F 11/1851 52/127.8 |
| 8,776,477 | B2 | * | 7/2014 | Sprague .............. E04F 11/1851 52/126.3 |
| 9,163,449 | B2 | | 10/2015 | Weiss et al. |
| 9,475,374 | B2 | * | 10/2016 | Murree .............. B29D 99/0053 |
| 9,777,484 | B2 | * | 10/2017 | Header ............... E04F 11/1853 |
| 10,081,978 | B2 | | 9/2018 | Weiss et al. |
| 2013/0000232 | A1 | | 1/2013 | Weiss et al. |
| 2016/0060945 | A1 | | 3/2016 | Weiss et al. |
| 2016/0340895 | A1 | | 11/2016 | Deiss et al. |
| 2018/0340363 | A1 | | 11/2018 | Pannunzio |

FOREIGN PATENT DOCUMENTS

| | | |
|---|---|---|
| DE | 9302781 U1 | 5/1993 |
| DE | 4412414 A1 | 12/1994 |
| DE | 19640041 A1 | 4/1998 |
| EP | 0611870 A1 | 8/1994 |
| EP | 0653542 A2 | 5/1995 |
| EP | 2369116 A2 | 9/2011 |
| FR | 2734019 A1 | 11/1996 |
| FR | 2801922 A1 | 6/2001 |
| GB | 2325954 A | 12/1998 |
| GB | 2352262 A | 1/2001 |
| NL | 1000412 C2 | 11/1996 |

OTHER PUBLICATIONS

Koster et al., U.S. Appl. No. 16/046,226, 639 pages.
Koster et al., U.S. Appl. No. 16/046,375, 817 pages.
Koster et al., U.S. Appl. No. 16/046,357, 142 pages.
Koster et al., U.S. Appl. No. 16/046,333, 681 pages.
Office Action dated Jun. 27, 2019 in connection with U.S. Appl. No. 16/046,226, 9 pages.
Office Action dated Nov. 29, 2019 in connection with U.S. Appl. No. 16/046,375, 10 pages.

* cited by examiner

GASKET RAILING SYSTEM FOR A WINDOW FRAME

TECHNICAL FIELD

Embodiments disclosed herein relate to the functional role, design, and method of use of a gasket railing system for a window frame.

BACKGROUND

Window frames and panes are used to provide visibility and structure while providing a barrier between an interior and an exterior space. Therefore, windows may provide aesthetic and/or functional purposes. Windows may be incorporated into residential buildings, commercial buildings, mobile dwelling spaces, vehicles, etc. Windows and/or window frames may be pre-assembled and/or assembled on-site during construction of a building. Windows may be connected to other supportive structure of a building and/or vehicle during assembly.

SUMMARY

In some embodiments, a gasket railing system may comprise a rail, the rail comprising a rail gasket at least partially disposed within the rail; and a leg insertion guide disposed within the rail gasket, the leg insertion guide forming a leg insertion cavity configured to receive a window frame leg, wherein the rail gasket comprises a pliable material, and wherein the leg insertion guide comprises a rigid material.

In some embodiments of the gasket railing system, the pliable material may comprise at least one of rubber and silicone.

In some embodiments of the gasket railing system, the rigid material may comprise at least one of nylon, acrylic, polyethylene, polypropylene, and polycarbonate.

In some embodiments of the gasket railing system, the window frame leg may comprise a first cross-section, and the leg insertion cavity may comprise a second cross-section complementary to the first cross-section.

In some embodiments of the gasket railing system, the first cross-section may be a horizontal cross-section of the window frame leg, and the second cross-section may be a horizontal cross-section of the leg insertion cavity.

In some embodiments of the gasket railing system, the leg insertion cavity may be configured to receive the window frame leg at a top end of the rail.

In some embodiments of the gasket railing system, the second cross-section may be a horizontal cross-section of the leg insertion cavity, and the second cross-section may be constant along the vertical length of the leg insertion cavity.

In some embodiments, the gasket railing system may comprise a leg stop disposed at a bottom end of the rail, and the leg stop may be configured to limit the downward vertical movement of the window frame leg from a top end of the rail to a bottom end of the rail.

In some embodiments of the gasket railing system, the leg insertion cavity may extend downward to the leg stop disposed at the bottom end of the rail.

In some embodiments of the gasket railing system, the leg insertion cavity may be configured to prevent the window frame leg from being inserted into and removed from an outward facing side of the leg insertion cavity, such that the window frame leg may only be able to be inserted and removed along a vertical axis of the leg insertion cavity.

In some embodiments, the gasket railing system may comprise a second leg insertion guide disposed within the rail gasket, such that the second leg insertion guide may form a second leg insertion cavity configured to receive a second window frame leg, and such that the second leg insertion guide may comprise a rigid material.

In some embodiments of the gasket railing system, the window frame leg may be connected to a first window frame, the second window frame leg may be connected to a second window frame, and the first window frame and second window frame may be adjacent after a first insertion of the window frame leg into the leg insertion cavity and a second insertion of the second window frame leg into the second leg insertion cavity.

In some embodiments of the gasket railing system, a bottom portion of the rail may be attached to a base, and the leg stop may prevent contact between a window frame connected to the window frame leg and the base during insertion of the window frame leg into the leg insertion cavity.

In some embodiments, a window frame may comprise four window frame sides and a window pane fully encased within the four window frame sides, such that a first window frame side comprises a leg configured to be received by a leg insertion cavity comprised in a rail, and such that a first horizontal width of the first window frame side is greater than or equal to half of a second horizontal width of the rail.

In some embodiments of the window frame, the four window frame sides may comprise aluminum.

In some embodiments of the window frame, the leg may comprise aluminum.

In some embodiments of the window frame, the leg insertion cavity comprised in the rail may be formed by a leg insertion guide made of rigid material, the leg insertion guide may be comprised in a rail gasket made of pliable material, and the rail gasket may be comprised in the rail.

In some embodiments, the window frame may comprise at least one screw connecting the first window frame side and a second window frame side.

In some embodiments of the window frame, a third window frame side substantially parallel to the first window frame side may comprise a second leg configured to be received by a second leg insertion cavity comprised in a second rail.

In some embodiments, the window frame may comprise a compressible backing portion disposed between the four window frame sides and the rail, after insertion of the leg into the leg insertion cavity comprised in the rail.

In some embodiments of the window frame, an outer vertical edge of the first window frame side may be positioned at a substantially horizontal midway point of the rail after insertion of the leg into the leg insertion cavity comprised in the rail.

BRIEF DESCRIPTION OF THE DRAWINGS

Reference is now made to the following descriptions taken in conjunction with the accompanying drawings.

DETAILED DESCRIPTION

Various aspects of the components of a gasket railing system design and the underlying elements of the disclosed embodiments involved in the mechanism, installation, and function of the gasket railing system, as outlined in the present disclosure, are described. It should be noted that the following explanations are merely exemplary in describing the inventions and methods of the present disclosure. Accordingly, several modifications, changes and substitutions are anticipated, and the following detailed description is not intended to limit the scope of the disclosure, as claimed. Further, while the descriptions that follow are meant to provide a detailed understanding of the disclosed embodiments of the gasket railing system design, some embodiments may use part or all of the details herein described. It should be noted that the figures that follow depict drawings of a gasket railing system and its underlying mechanism that are not to precise scale. Moreover, directional terms such as top, bottom, left, right, inside, outside, distal and proximal may be used with respect to the referenced figures in the text that follows, not to be related to anything beyond the referenced figures. Said differently, directional terms are not to be construed as limiting in scope of the disclosed inventions as they are merely descriptive of the figures that are referenced. For example, a side may refer to at least one of a top side, a bottom side, a left side, a right side, a front side, a rear side, a surface, an edge, and/or the like. Finally, descriptive words such as ridges, ribs, and anchors, in the plural or singular, may be used interchangeably to describe various aspects of the invention depending on the embodiment of the gasket railing system and its underlying components.

Figure 1:
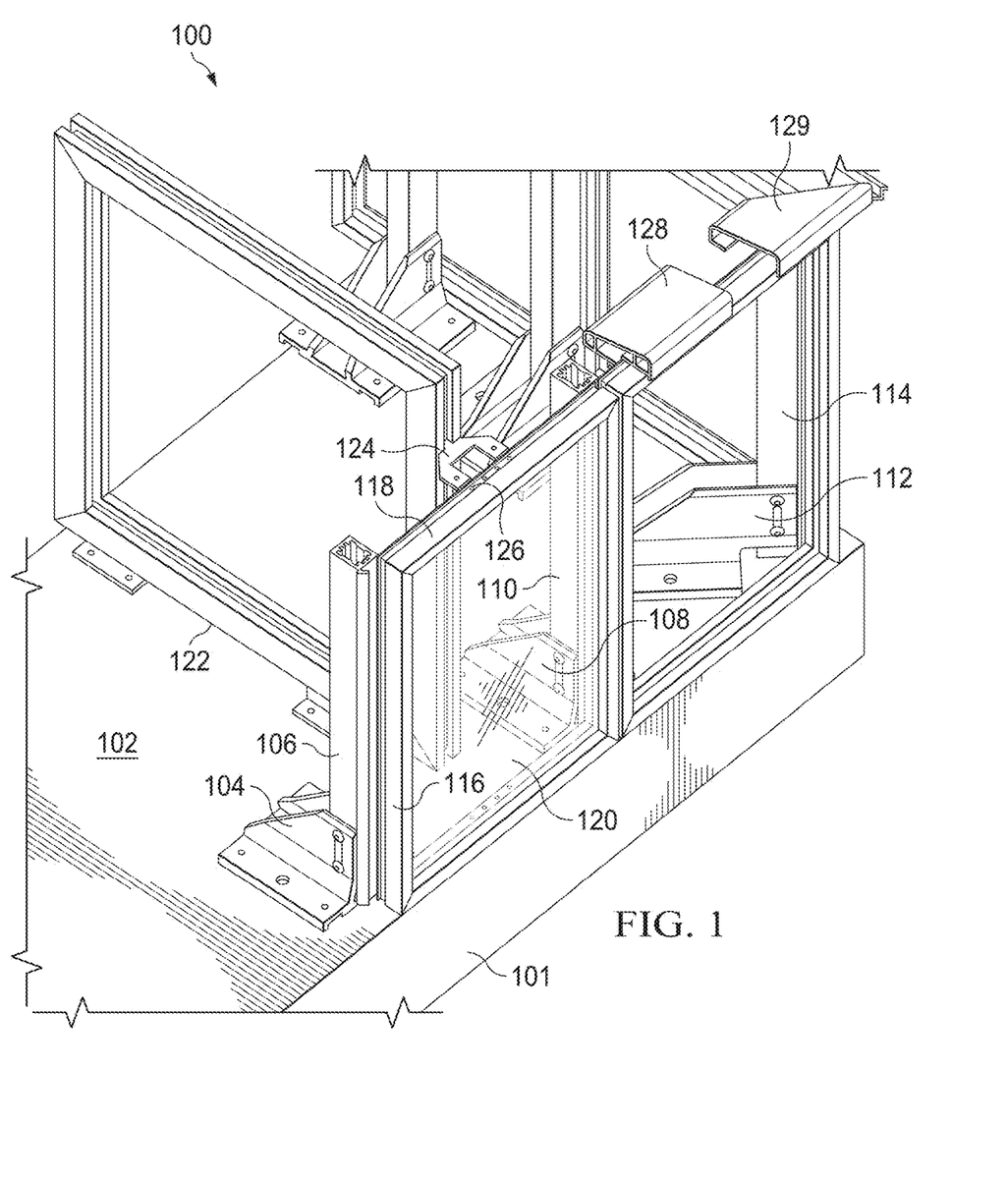
FIG. 1 illustrates a perspective view of a window frame system, in accordance with some embodiments of the disclosure.

FIG. 1 illustrates an example embodiment of a window frame system 100. A window frame system 100 may comprise a base 102 with an exterior portion 101. A window frame system 100 may comprise one or more rails 106, 110, 114, one or more rail supports 104, 108, 112, one or more window panes 120, one or more window frame sides 116, 118, 122, and/or one or more window frame attachments 128, 129. A window frame system may comprise a connector 124 that connects an intermediary window frame (e.g., corresponding to the window frame side 122) to a window frame (e.g., corresponding to the window frame sides 116, 118). Additionally or alternatively, a window frame (e.g., corresponding to the window frame sides 116, 118) may comprise one or more bores 126. For example, the one or more bores 126 may be used to connect a window frame (e.g., corresponding to the window frame sides 116, 118) with a connector 124 and/or to secure a window pane 120 within a window frame (e.g., corresponding to the window frame sides 116, 118).

A window frame system 100 may be constructed and/or installed near the exterior of a building and/or vehicle. For example, a trailer home, pre-fabricated home, residential house, and/or office building may comprise a window frame system. The base 102 of a window frame system may comprise a foundation of a building and/or a base plate of a vehicle. A base 102 may comprise concrete, rock, cement, wood, metal, plastic, clay, and/or any other material operable to provide a firm, level, and/or smooth surface onto which one or more rail supports 104, 108, 112, one or more rails 106, 110, 114, and/or one or more window frames may be attached. The one or more rail supports 104, 108, 112, one or more rails 106, 110, 114, and/or one or more window frames may be attached to a base 102 by a bolt, screw, male and female attachment, adhesive, clip, interference fit, post hole, overlay of base material, and/or welded joint. An exterior portion 101 of a base 102 may correspond to an outside of a building and/or vehicle, an inside of a building and/or vehicle, bottom portion of a building and/or vehicle, a top portion of a building and/or vehicle, and/or a specially treated surface of the base 102. For example, an exterior portion 101 may come in more regular contact with natural elements (e.g., rain, wind, heat, cold, dirt, snow) than other (e.g., interior portions) of a window frame system 100. Therefore, an exterior portion 101 may seal, comprise a different material than the rest of the base 102, and/or be covered by another material than the base 102 material. In some embodiments, a window frame (e.g., corresponding to window frame sides 116, 118) may be installed and/or assembled such that the window frame and the exterior portion 101 of the base 102 are flush and/or have an even surface protrusion relative to each other. The outer surfaces of a window frame and exterior portion 101 of a base 102 may be aligned for aesthetic, sealing (e.g., to prevent ingress of rain, wind, different temperature air, and/or particles into an interior portion), safety (e.g., to avoid snagging on a protruding edge), and/or space efficiency purposes (e.g., pre-fabricated window frame assemblies 100 could be packed closer together during storage and/or transportation). In some embodiments, a window frame and an exterior portion 101 of a base 102 may not be flush (e.g., for aesthetic, sealing, design, and/or safety purposes).

A window frame (e.g., corresponding to the window frame sides 116, 118) may be mounted to, inserted to, attached to, connected to, and/or snapped into one or more rails 106, 110, 114 during assembly. In some embodiments, a window frame may comprise one or more integrally formed window frame sides 116, 118, and/or may be assembled by attaching and/or connecting one or more window frame sides 116, 118. Rails 106, 110, 114 may also be referred to as posts, railings, supports, bars, poles, shafts, struts, supports, and/or stakes. Rails 106, 110, 114 may be oriented orthogonal to an exterior portion 101 surface of a base 102 (e.g., rails 106, 110), at an angle (e.g., diagonal) relative to an exterior portion 101 surface of a base 102, (e.g., rail 114), and/or parallel to an exterior portion 101 surface of a base 102. The orientation of a rail 106, 110, 114 may be based at least in part on the desired assembly angle of a window frame. For example, rail 114 may be angled at a corner of a base 102 in order to accommodate attachment and/or insertion of window frames substantially aligned with one or more exterior portions 101. A window frame may be supported and/or attached to two rails 106, 110, 114. For example, as illustrated in FIG. 1, a window frame corresponding to window frame sides 116, 118 may be connected on both sides to rails 106, 110. The connection, attachment, and/or insertion portion of a rail 106, 110, 114 may be modified and/or different depending on the angle of connection, attachment, and/or insertion with a window frame. A rail 106, 110, 114 may be connected to one or more rail supports 104, 108, 112 (e.g. by a bolt, screw, nut, male and female connector, interference fit, and/or welded joint). A rail 106, 110, 114 may provide structural support to a window frame (e.g. hold a window frame upright and/or in place) based at least in part on a connection with a rail support 104, 108, 112, and the connection between a rail support 104, 108, 112 and a base 102.

In some embodiments, a window frame (e.g. corresponding to window frame sides 116, 118) may fully encase a window pane 120. For example, all four sides of a window pane 120 (e.g. two of the window pane sides corresponding to window frame sides 116, 118) may be enclosed, wrapped, covered, encased, and/or inserted into one or more window frame sides 116, 118. A window frame may comprise a sash which holds a window pane 120. A window pane may be attached to, connected to, and/or encased within a window frame and/or sash via adhesive, interference fit, male and female connectors, one or more screws or bolts inserted through the window frame and/or sash against the window pane 120 (e.g. via one or more bores 126 in the window frame), a window pane support (not shown in FIG. 1) holding the window pane 120 within the window frame and/or sash, a slot comprised within the window frame and/or sash, and/or gravity. A window pane 120 may be fully enclosed by a window frame and/or sash in order to provide temperature and/or debris insulation between in an interior and exterior side of the window pane 120, to provide a monolithic component during a window frame system assembly (e.g., for design simplicity and/or ease of assembly), and/or to accommodate thermal expansion and/or compression of a window frame, sash, and/or window pane 120 during temperature fluctuations. In some embodiments, a window pane 120 may not be fully enclosed and/or encased by a window frame and/or sash.

A window frame may comprise sides 116, 118, each of which may be referred to by one or more alternative terms. For example, a top of a window frame (e.g., window frame side 118) may be referred to as a head. A horizontal side of a window frame (e.g., window frame side 116) may be referred to as a jamb. A bottom of a window frame (e.g., the window frame side opposite of window frame side 118) may be referred to as a sill. Similarly, a sash of a window frame may comprise sides, each of which may be referred to by one or more alternative terms. For example, a horizontal side of a sash (e.g., substantially parallel to window frame side 116) may be referred to as a stile. A top of bottom side of a sash (e.g., substantially parallel to window frame side 118) may be referred to as a rail. A window frame and/or sash may comprise one or more subcomponents (e.g., sides such as a sill, jamb, head, stile, and/or rail) comprised of metal (e.g., aluminum, steel, stainless steel, alloy, wood, stone, concrete, plastic, polycarbonate, elastic materials (e.g., rubber), and/or vinyl. A window pane 120 may comprise glass, laminated glass, safety glass, polycarbonate, acrylic, Plexiglas, film, glazing, and/or any transparent and/or translucent material. Alternatively or additionally, a window pane 120 may comprise additional structure (e.g., a grille) for structural integrity, aesthetic, and/or durability purposes.

A window frame system may additionally or alternatively comprise one or more frame attachments 128, 129 and/or connectors 124 between one or more window frames (e.g., the window frames corresponding to window frame sides 116, 118 and 122). For example, a window frame connector 124 may be used between two or more window frames in order to provide structural support between the two or more window frames. Additionally or alternatively, a connector 124 may allow for rotational movement of one window frame to one or more other window frames about one or more axes (e.g., via a hinge joint, ball joint, etc.). A connector 124 may be connected to one or more window frames via one or more screws and/or bolts (e.g., via one or more bores 126), one or more welded joints, and/or a male and female slot (as shown on the window frame comprising window frame side 122). One or more window frame attachments 128, 129 may comprise one or more fins, clips, receptors, and/or anchors. The one or more window frame attachments 128, 129 may be used to provide insulation (e.g., with respect to temperature and/or debris), padding, intermediary components (e.g., wedges) between a window frame and another structural component, a flexible structural component, aesthetic features, an attachment point for an aesthetic (e.g., a cover and/or panel) and/or functional (e.g., mesh screen) component, and/or a temporary safety and/or protection measure during installation and/or assembly (e.g., to protect a human from sharp edges and/or to protect a window frame from scratches and/or blemishes).

Figure 2:
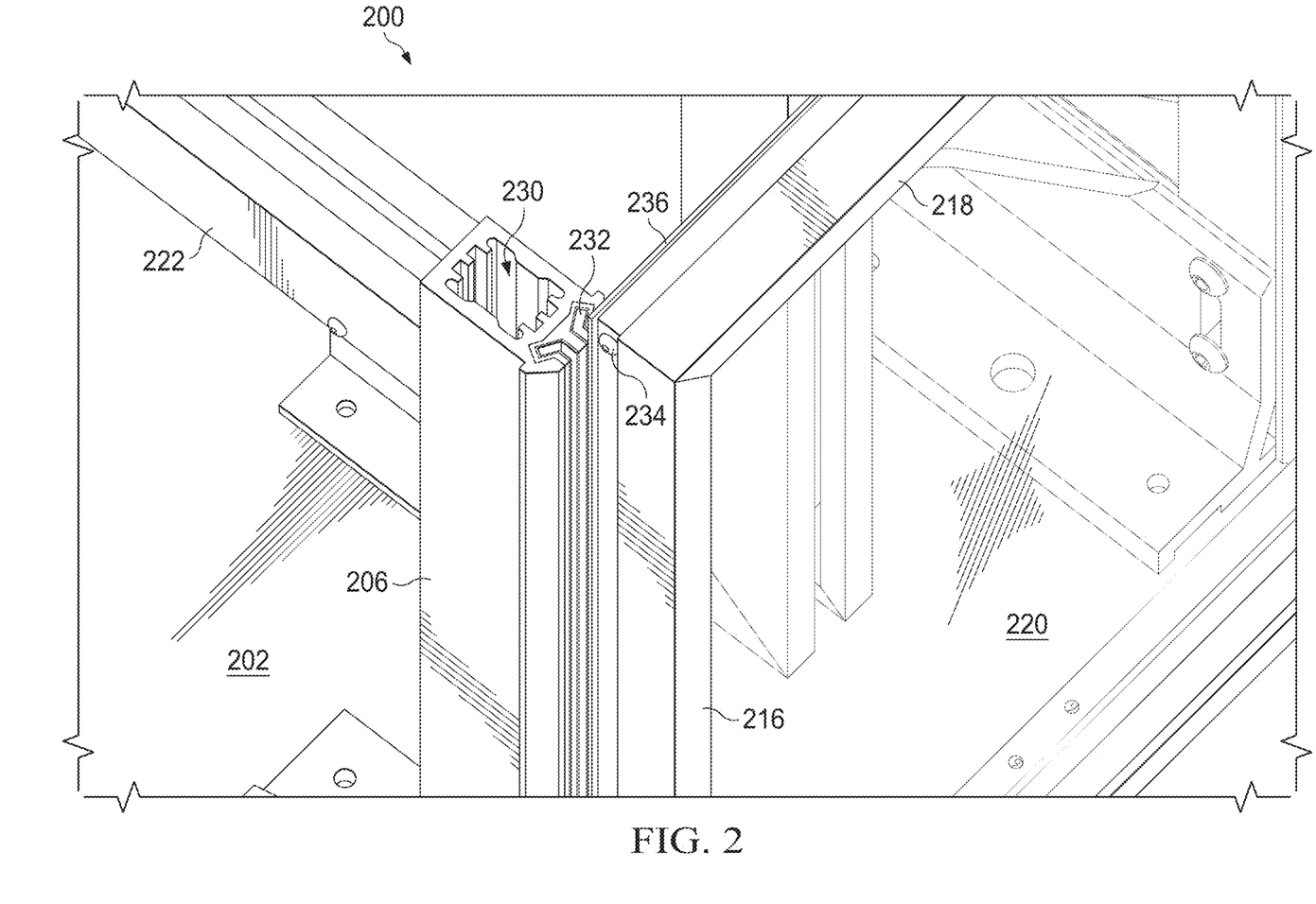
FIG. 2 illustrates a perspective view of a gasket railing system, in accordance with some embodiments of the disclosure.

FIG. 2 illustrates an example embodiment of a gasket railing system for a window frame system 200. A window frame system 200 may comprise one or more window frame sides 216, 218, 222 (e.g., corresponding to one or more window frames), a base 202, one or more rails 206 (which may further comprise a hollow portion 230, bore, and/or cutout), and/or one or more window panes 220. A window frame may further comprise one or more legs 232, one or more bolts 234, and/or one or more backing portions 236. A window frame (e.g., the window frame corresponding to window frame sides 216, 218) may be connected to a rail 206 via a leg 232 of the window frame. A leg 232 may fully engage a rail 206 (e.g., the leg 232 may be disposed within and/or connected to the rail along the entire vertical length of the rail and/or along a substantial portion of the rail). A leg of the window frame may be attached to a window frame side 216, window frame backing 236, and/or sash of a window frame. A window frame backing 236 may be used for aesthetic purposes, as an intermediary element to connect a leg 232 to a window frame and/or window frame side 216, to provide additional sealing between an interior side and an exterior side of a window pane 220 (e.g., via a gasket, pliable material, rubber seal, flange, and/or lip), to provide a filling structural element between a window frame and a rail 206 (e.g., for window frame positioning purposes and/or to provide a more rigid final window frame assembly), and/or to provide a pliable and/or compressible interface between a window frame and a rail 206 (e.g., for sealing, mechanical tolerances, temperature fluctuation, and/or ease of installation purposes). A bolt 234 and/or screw may be inserted (e.g., horizontally, vertically, and/or transversely) into a window frame in order to attach a leg 232 to a window frame, to attach a backing 236 to a window frame, to connect two or more window frame sides 216, 218, and/or to secure and/or hold in place a window pane 220. For example a bolt 234 and/or screw may be installed at one or more corners of a window frame in order to hold one or more window frame sides 216, 218 together.

Figure 3:
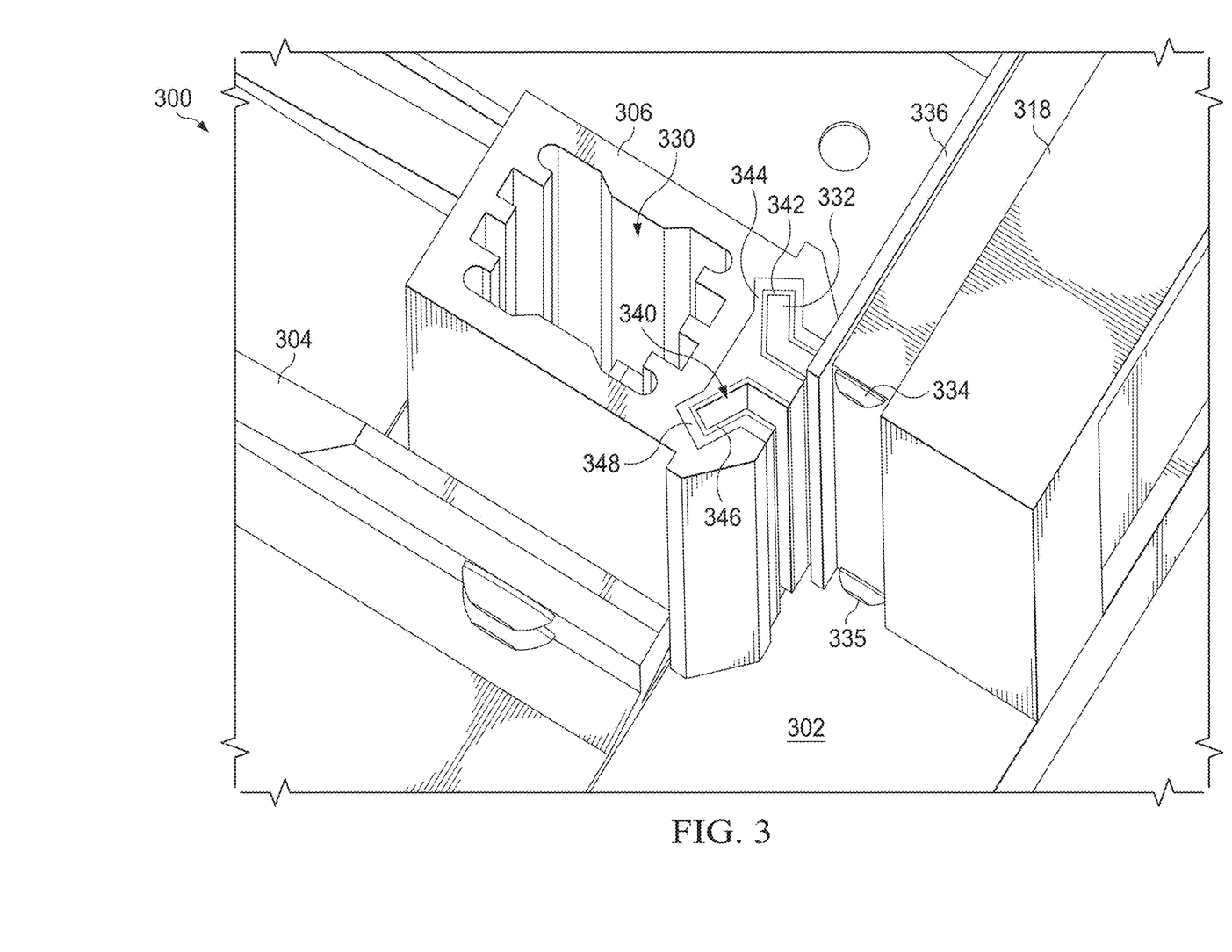
FIG. 3 illustrates a perspective view of a gasket railing system, in accordance with some embodiments of the disclosure.

FIG. 3 illustrates an example embodiment of a gasket railing system 300. A gasket railing system 300 may comprise a base 302, one or more rails 306, one or more rail supports 304, and/or one or more window frames (e.g., corresponding to window frame side 318). A window frame may comprise one or more window frame bolts 334, 335, a window frame backing 336, and/or one or more legs 332. A rail 306 may comprise a hollow portion 330, one or more leg insertion cavities 340, one or more leg insertion guides 342, 346, and/or one or more rail gaskets 344, 348.

A rail 306 may also be referred to as an extrusion, and may be manufactured by an extrusion process. The manufacturing process of a rail 306 may inherently produce a hollow portion 330 (e.g., possibly due to an extrusion manufacturing process) and/or a hollow portion 330 may be carved and/or subtractively formed within the rail 306. A hollow portion 330 may comprise a circular or other simple geometry. Alternatively or additionally, a hollow portion 330 may comprise at least a partially concave and/or convex contour, which may allow for a mating portion (not shown), for example, which may protrude upwardly from the base 302, to mate with the hollow portion 330 of the rail 306. A mating between the hollow portion 330 and a mating portion (not shown) of a complementary shape may align the rail 306 at a desired position and/or orientation on the base 302, align the rail 306 at a desired position and/or orientation relative to a rail support 304, and/or may secure the position and/or orientation of the rail 306 relative to the base 302 and/or a rail support 304 after assembly and/or installation of the gasket railing system 300. Alternatively or additionally, a hollow portion 330 of a rail 306 may reduce material costs of the rail 306, manufacturing time of the rail 306, weight of the rail 306, and/or provide interior access to the rail 306 (e.g., during gasket railing system 300 assembly, and/or in order to attach the rail 306 to a rail support 304, e.g., via a nut and bolt). The geometry and/or vertical profile of a hollow portion 330 of a rail 306 may be designed and/or manufactured to increase and/or maximize the structural integrity of the rail 306 relative to other hollow portion 330 geometries. A hollow portion 330 may be formed to be complementary to a tool for handling the rail 306, and/or may comprise slots for insertion of other elements into the rail 306.

A rail 306 may be used to connect a window frame to a base 302 and/or to secure a window frame in a desired position and/or orientation. A rail 306 may comprise a leg insertion cavity 340 for insertion of a leg 332 of a window frame. For example, as illustrated, the leg 332 is inserted into a leg insertion cavity (not labeled in FIG. 3). A rail may also comprise one or more insertion guides 342, 346, which may facilitate insertion of a leg 332 into a leg insertion cavity 340. A leg insertion guide 342, 346 may comprise a more rigid material in order to substantially preserve its shape during the insertion of a leg 332, which may facilitate the insertion of the leg 332. Additionally or alternatively, a rail 306 may comprise one or more rail gaskets 344, 348, which may provide a compressible, deformable, and/or sealing material between a window frame leg 332 and a rail 306. For example, rail gaskets 344, 348 may substantially and/or fully prevent air movement, moisture, and/or debris from passing between the leg insertion cavities 346 and the remaining portion of the rail 306, which may correspond to an exterior region and an interior region of a gasket railing system 300, respectively. A rail gasket 344, 348 may form a seal with a rail 306, window frame backing 336, a window frame, a sash of a window frame, and/or any material inserted between the rail gasket 344, 348 and a window frame. A rail gasket 344, 348 may provide positional and/or rotational pliability of a leg insertion cavity 340 during insertion and/or assembly of a leg 332. Additionally or alternatively, a rail gasket 344, 348 may provide insulation between a window frame portion (e.g. a leg 332, backing portion 336, and/or window frame side 318) and a rail 306. A rail gasket 344, 348 may fluctuate in size and/or sealing strength based on temperature. Insertion of a leg 332 into a leg insertion cavity 340 directly abutting a rail gasket 344, 348 (e.g. such that a leg insertion guide 342, 346 is not present) may be more difficult to install than if a leg insertion guide 342, 346 provided a structured and/or at least semi-rigid interface between the leg insertion cavity 340 and the rail gasket 344, 348, as a rail gasket 344, 348 may deform and/or snag on the edges of the leg 332 during insertion of the leg 332 into its leg insertion cavity (not labeled in FIG. 3). Alternatively or additionally, a leg insertion guide 342, 346 may substantially retain its physical size and/or form during temperature fluctuations, which may advantageously allow for insertion and/or removal a leg 332 under different ambient temperatures (e.g. when the temperature is hot, and materials generally expand in size). Thus, it may be beneficial to provide a leg insertion guide 342, 346 between the leg insertion cavity 346 and the rail gasket 344, 348. In some embodiments rail gaskets 344, 348 may comprise the same gasket (e.g. rail gaskets 344, 348 may be integrally formed).

A leg 332 may be inserted vertically downward into the leg insertion cavity (e.g. from the top of the rail 306, which may be defined to be on the opposite side of the rail 306 proximal to the base 302). Alternatively or additionally, a leg 332 may be inserted horizontally, pressed in, and/or snapped into the leg insertion cavity 346 (which may abut a leg insertion guide 342, 346, and/or a rail gasket 344, 348. A gasket railing system 300, and/or a leg insertion cavity 340, leg insertion guide 342, 346, and/or rail gasket 344, 348, thereof, may be formed such that a leg 332 can only be inserted vertically downward (and/or vertically upward), such that an additional structural component (not shown) placed on top of a rail 306, leg 332, leg insertion cavity 340, leg insertion guide 342, 346, and/or rail gasket 344, 348, would prevent, inhibit, and/or impede the removal of the leg 332 and/or corresponding window frame, thereby securing the leg 332 and/or corresponding window frame in place. For example, the geometry of the leg insertion cavity 340 as illustrated in FIG. 3 may only allow insertion of a leg 332 vertically downward from the top of the leg insertion cavity 340. The geometries (e.g., top-view and/or vertical profiles) of a leg insertion cavity 340, leg insertion guide 342, 346, and/or rail gasket 344, 348, and the geometry (e.g., top-view and/or vertical profile) of a leg 332 may be complementary in order to facilitate insertion of the leg, in order to provide a rigid structural fit between the leg 332 and the rail 306, and/or to provide sealing (e.g., of air, water, debris) between an exterior region of a gasket railing system 300 and an interior region of a gasket railing system 300.

A rail 306, elements comprised within the rail (e.g., a hollow portion 330, a leg insertion cavity 340, a leg insertion guide 342, 346, and/or a rail gasket 344, 348), and/or a leg 332 may have a cross-section and/or top-down profile and/or geometry consistent along a vertical axis of the rail 306, elements comprised within the rail, and/or leg 332. A consistent cross-section geometry along a vertical axis may reduce manufacturing costs and/or may facilitate assembly (e.g., insertion of the leg 332 into the leg insertion cavity 340). A rail 306 may comprise aluminum, alloy, steel, iron, metal, plastic, polycarbonate, cement, wood, stone, and/or any substantially rigid material. A rail gasket 344, 348 may comprise rubber, soft rubber, silicone, cork, plastic polymer, and/or any compressible and/or resilient material. A leg insertion guide 342, 346 may comprise, plastic, hard plastic, thermoplastic, thermoset, polycarbonate, polyethylene, acrylic, metal, any compressible and/or resilient material, and/or any substantially rigid material. A leg 332 may comprise aluminum, alloy, steel, stainless steel, coated metal, plastic, hard plastic, any compressible and/or resilient material, and/or any substantially resilient material. Lubricant, film, adhesive, and/or sealant may be added and/or coated on at least one of a rail 306, hollow portion 330, rail gasket 344, 348, leg insertion guide 342, 346, leg insertion cavity 340, and/or leg 332 (e.g., for ease of installation, sealing, insulation, surface protection, backfilling, and/or attachment purposes). A rail gasket 344, 348 and/or leg insertion guide 342, 346 may be integrally formed with each and/or a rail 306, and/or may be assembled and/or installed by sliding one into the other (e.g., with lubricant and/or a sealant), interference fit (e.g., a friction fit), adhesive, and/or a male and female connector (not shown). Two or more among the set of the rail gasket 344, 348, leg insertion guide 342, 346, and/or rail 306 may be complementary formed (e.g., in order to facilitate assembly, maintain assembly post-installation, provide a seal, provide a space efficient design, and/or provide an interference fit).

Figure 4:
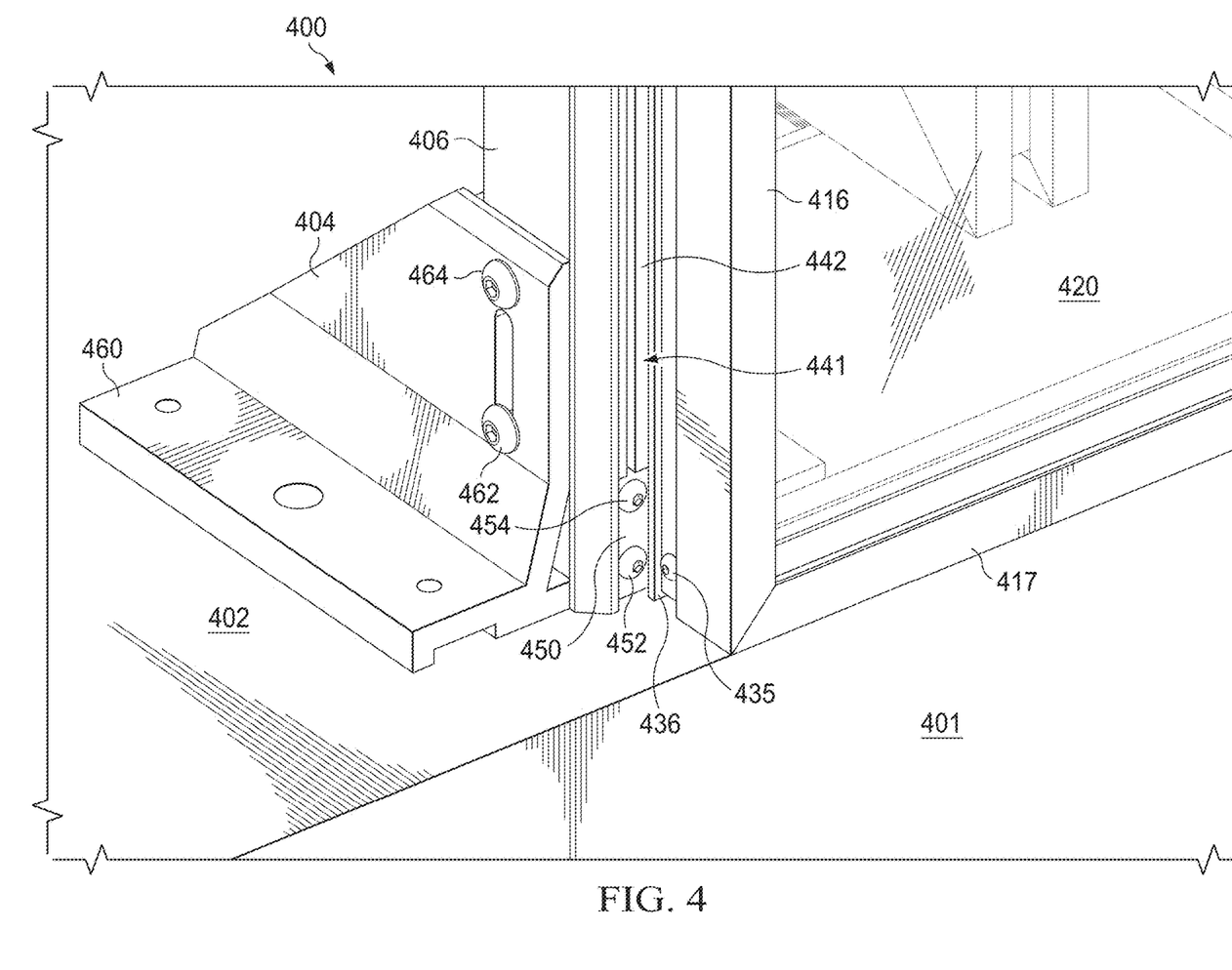
FIG. 4 illustrates a perspective view of a window frame system, in accordance with some embodiments of the disclosure.

FIG. 4 illustrates an additional view of an example embodiment of a gasket railing system 400. A gasket railing system 400 may comprise a base 402 (which may further comprise an exterior portion 401), a rail 406, a rail support 404, and a window (e.g., corresponding to window frame sides 416, 417). A window frame may further comprise one or more window frame sides 416, 417, one or more bolts 435, a backing portion 436, and/or a window pane 420. A window pane 420 may be fully encased in the window frame, comprised within the window frame, and/or separate from but connected to the window frame. A rail support may further comprise a rail support base 460 and/or one or more bolts 462, 464. A rail support base 460 may be integrally formed with the rail support 404 (and/or a top portion of thereof) and/or may be a separate component attached to the remained of the rail support 404 (e.g., a top portion thereof). A rail support base 460 may comprise one or more bores (not labeled in FIG. 4) configured to facilitate mounting the rail support base 460 and/or rail support 404 to the base 402. A rail support 404 and/or rail support base 460 may be connected and/or attached to a base 402 by one or more screws, one or more bolts, one or more male and female connectors, interference fit, and/or adhesive. One or more bolts 462, 464 of a rail support 404 may be used to connect the rail support 404 to one or more rails 406 (e.g., via one or more bores in the rail support 404 and/or rail 406).

A rail may further comprise one or more leg insertion cavities 441, one or more leg insertion guides 442, one or more rail gaskets (not labeled in FIG. 4), one or more leg stops 450, and/or one or more bolts 452, 454. One or more bolts 452, 454 may be used to attach the one or more leg stops 450 to the rail 406 and/or to connect the rail 406 to a rail support 404 and/or a rail support base 460. A leg stop 450 may be used and/or designed to define a lower bound to which a leg (not illustrated in FIG. 4) and/or window frame can be vertically installed. A leg stop 450 may additionally or alternatively provide a stopping point that a window leg and/or window frame can be installed to (e.g., for ease of installation, standardization purposes, aesthetic purposes, insulation purposes, and/or sealing purposes). As illustrated in FIG. 4, a leg stop 450 may be designed and/or installed such that the leg stop does not protrude horizontally beyond the region correspond to the one or more leg insertion cavities 441, leg insertion guides 442, and/or rail gaskets. Additionally or alternatively, bolts 452, 454 located near and/or through the leg stop 450 may be positioned such that they do not mechanically and/or structurally interfere with the placement and/or installation of a window frame and/or leg thereof. For example, the leg stop 450 and/or bolts 452, 454 may be sufficiently low-profile (with respect to an outward-facing surface of a respective rail 406, e.g., corresponding to the side of the rail exposing the one or more leg insertion cavities 441) such that a window frame and/or backing portion 436 of a window frame can still slide over the rail 406, leg stop 450, and/or bolts 452, 454 thereof.

A leg stop 450 may be positioned and/or designed to limit the downward placement of a window frame and/or leg thereof. A stop position of a window frame and/or leg thereof may be such that the window frame touches the base 402 and/or exterior portion 401 thereof. Additionally or alternatively, leg stop 450 may be positioned and/or designed such that a window frame and/or leg thereof cannot progress vertically downward (and/or any other direction, e.g., upward) such that a bottom side of a window frame (e.g., the side facing the base 402, which may correspond to the bottom of window frame side 417 in FIG. 4) does not and/or cannot come in contact with the base 402 and/or an exterior portion 401 thereof. A rail 406 may be positioned relative to and/or attached to a rail support 404 such that the leg stop provides the desired stop position for one or more window frames and/or legs thereof. For example, as illustrated in FIG. 4, a bolt 462 of a rail support 404 may be adjusted among a range of positions within an elongated bore hole (not labeled in FIG. 4) in order for a leg stop 450 to provide a desired stop position. A window frame leg (not illustrated in FIG. 4) may be disposed within, inserted into, and/or engaged with a rail 406 along substantially the entire vertical length of the rail. For example a leg of a window frame may occupy a leg insertion cavity 441 from a top portion of the rail 406 up to and possibly abutting a leg stop 450 of the rail. A bottom portion of a leg insertion cavity 441 may be filled with at least a portion of a leg insertion guide 442, a rail gasket, and/or a leg stop 450.

Figure 5:
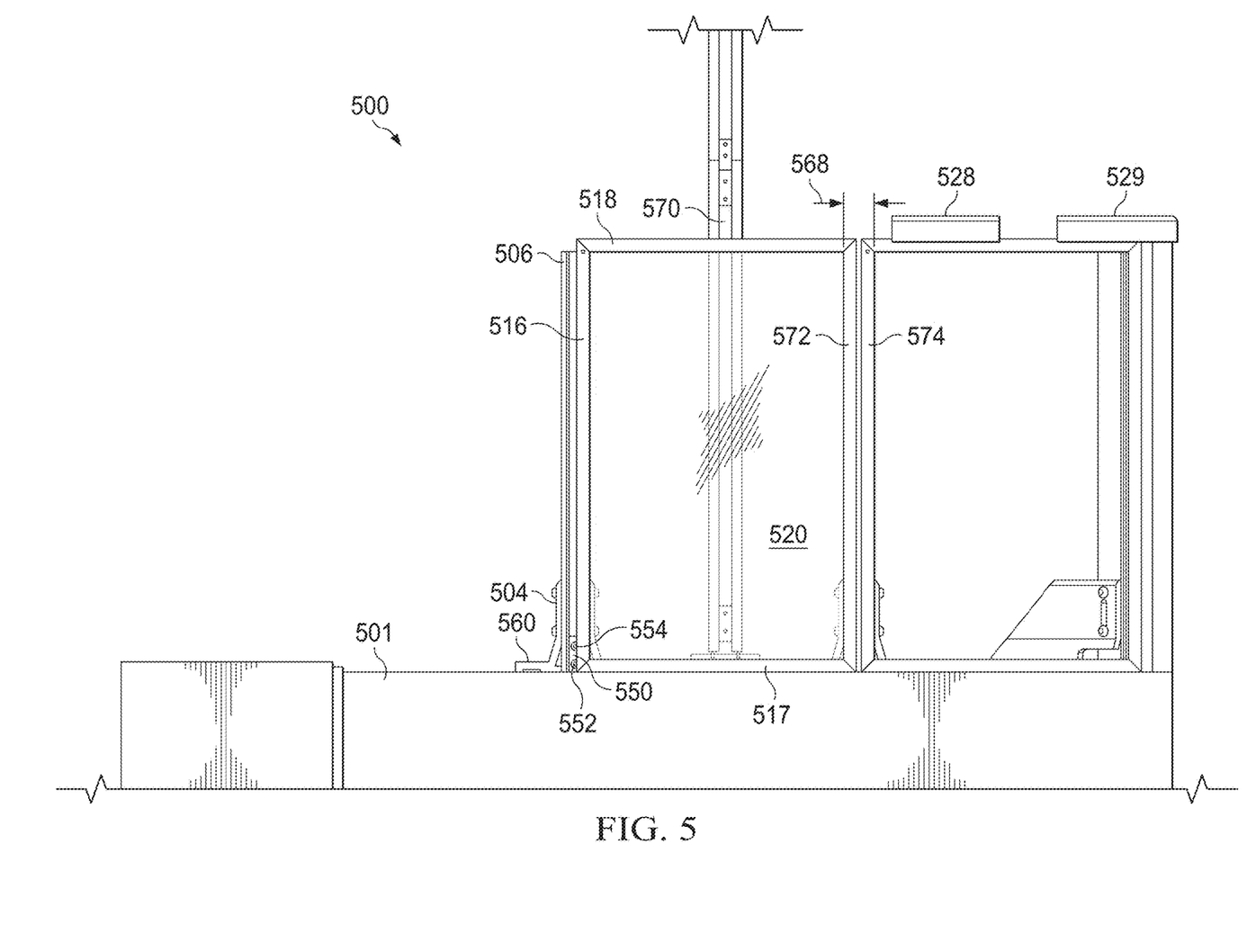
FIG. 5 illustrates a front view of a window frame system, in accordance with some embodiments of the disclosure.

FIG. 5 illustrates a front view of an example embodiment of a window frame system 500. A window frame system may comprise a base (which may further comprise an exterior portion 501), one or more rails 506, one or more rail supports 504 (which may further comprise one or more rail support bases 560), one or more window frames (e.g., corresponding to window frame sides 516, 517, 518, 572, 574), one or more window panes 420 (which may be comprised in and/or fully encased by corresponding window frames), and/or a structural divider 522. A structural frame divider 570 may comprise one or more window frames, one or more window frame sides, a support post (e.g., to be connected to a window frame, such as the window frame corresponding to window frame sides 516, 517, 518, 572, 574), an insulation barrier, an acoustic barrier, and/or a structural component for a window frame system and/or a corresponding building and/or vehicle. One or more window frame attachments 528, 529 may be attached to one or more window frames. A rail 506 may further comprise one or more leg stops 550 and/or one or more bolts 552, 554. One or more window frames and/or legs thereof may share one or more rail. For example, a right leg of a first window frame may be engaged to and/or disposed within a left leg insertion cavity of a rail 506 while a left leg of a second window frame may be engaged to and/or disposed within a right leg insertion cavity of a rail 506.

The outwardly-facing width (e.g., the side facing out of the page of FIG. 5) of a rail 506, window frame side 516, 517, 518, 572, 574, window frame sash (not shown in FIG. 5), and/or backing portion of a window frame may be such that one or more components of a window frame (e.g., a window frame side 516, 517, 518, 572, 574 window frame sash, and/or backing portion) may partially and/or fully cover a rail 506, leg stop 550, and/or hardware associated with a rail 506 and/or leg stop 550 (e.g., a bolt disposed within a rail 506, rail support 504, rail support base 560, and/or leg stop 550, such as the bolts 552, 554). For example, as illustrated in FIG. 5, the horizontal dimension 568 of two adjacent (and possibly installed into and/or engaged with an unseen rail) window frame sides 572, 574 is greater than the horizontal dimension of a rail 506. However, as illustrated, the horizontal dimension 568 of the adjacent window frame sides 572, 574 is not wide enough to fully cover the corresponding rail support and associated hardware from view through a window pane 520.

Dimensions and/or positioning of a window frame, window frame side 516, 517, 518, 572, 574, window frame sash (not illustrated in FIG. 5), backing portion of a window frame (not labeled in FIG. 5), window frame leg, rail 506, rail support 504, rail support base 560, rail gasket, leg insertion cavity, leg insertion guide, and/or assembly hardware thereof partially, substantially, and/or fully occlude the view of the rail 506, rail support 504, rail support base 560, rail gasket, leg insertion cavity, leg insertion guide, and/or assembly hardware thereof from a human observer on an exterior side of the window (e.g., the side corresponding to an exterior portion 501 of a base). For example, adjacent window frame sides 572, 574 may be positioned closely enough together or enough contact each other after insulation such that an interior region of a rail 506 and/or associated components may not be visibly from an exterior region. Additionally or alternatively, a width of window frame sides 516, 517, 518, 572, 574 may be large enough to at least partially occlude the view of a rail 506, rail support 504, and/or rail support base 560. For example, one or more window frame sides 516, 517, 518, 572, 574 may have a width of approximately 2", and/or a rail 506 may have a width of approximately 4". Dimensions and/or positioning of window frame system 500 and/or gasket railing system components (e.g., as illustrated in FIGS. 4 and 5) may at least partially occlude visibility of non-window frame components (e.g., the gasket railing system, rail 506, and/or rail support 504) for aesthetic purposes, viewing maximization purposes, space efficiency purposes, and/or insulation purposes. For example, one or more window frame sides 516, 517, 518, 572, 574 and/or adjacent window frame sides 572, 574 of adjacent window frames attached to the same rail 506 may be positioned at a substantially midway horizontal point of the rail 506. For example, if a horizontal width of the rail 506 is 4", an outer edge of a window frame side 516, 517, 518, 572, 574 may be positioned halfway between each side of the rail 506, or at about 2" horizontally into the rail 506 width. Such positioning of one or more window frame sides 516, 517, 518, 572, 574 may visually occlude the rail 506 and/or gasket railing system from view by an exterior observer (e.g., for aesthetic purposes) and/or may assist and/or provide sealing between an exterior portion of the one or more window frames comprising the one or more window frame sides 516, 517, 518, 572, 574 and an interior portion of the window frames. In some embodiments the horizontal width of one or more window frame sides 516, 517, 518, 572, 574 may be less than half of the width of an associated rail 506. For example, the outer edge of the one or more window frame sides 516, 517, 518, 572, 574 may be positioned at less than halfway into the horizontal width of the rail 506 (e.g., the outer edge may only be positioned 1" in along a 4" rail 506). The inner edge of such a positioned window frame side 516, 517, 518, 572, 574 may or may not extend up to and/or beyond an outer edge of the rail 506. For example, a 2" window frame side 516, 517, 518, 572, 574 positioned 1" into a 4" rail 506 may have an inner edge that extends beyond the outer edge of the rail 506 of that side, which may substantially visually occlude the rail from an exterior observer (e.g., for aesthetic purposes).

Figure 6:
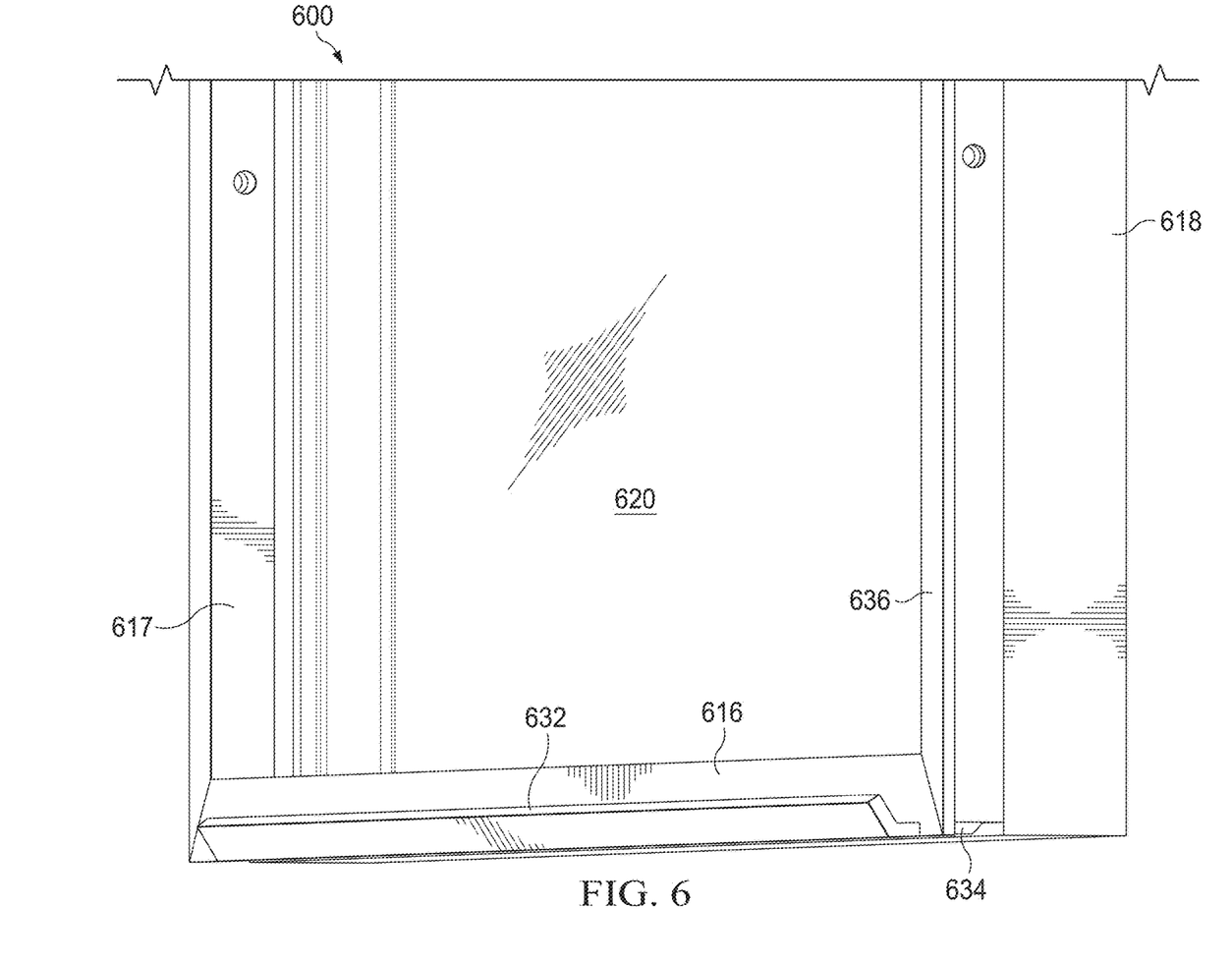
FIG. 6 illustrates a perspective view of a window frame, in accordance with some embodiments of the disclosure.

FIG. 6 illustrates an example embodiment of a window frame 600. A window frame 600 may comprise one or more window frame sides 616, 617, 618, one or more legs 632, a backing portion 636, one or more bolts 634, and/or a window pane 620. A leg 632 may run partially, substantially, and/or fully along a window frame side 616, 617, 618, and/or a side of a backing portion 636 of a window frame. In some embodiments, a leg 632 may not extend fully along a window frame side 616, 617, 618, and/or a side of a backing portion 636 of a window frame in order to accommodate a leg stop (not illustrated in FIG. 6) and/or because a full engagement between a leg 632 and a rail (and/or a leg insertion cavity, leg insertion guide, and/or rail gasket thereof) is not required to maintain a secure connection between the leg 632 (and/or window frame 600 thereof) and the rail (not illustrated in FIG. 6). A bolt 634 and/or screw may be used to secure and/or tighten one or more window frame sides 616, 617, 618, backing portions 636, legs 632, and/or window panes 620 to each other.

Figure 7:
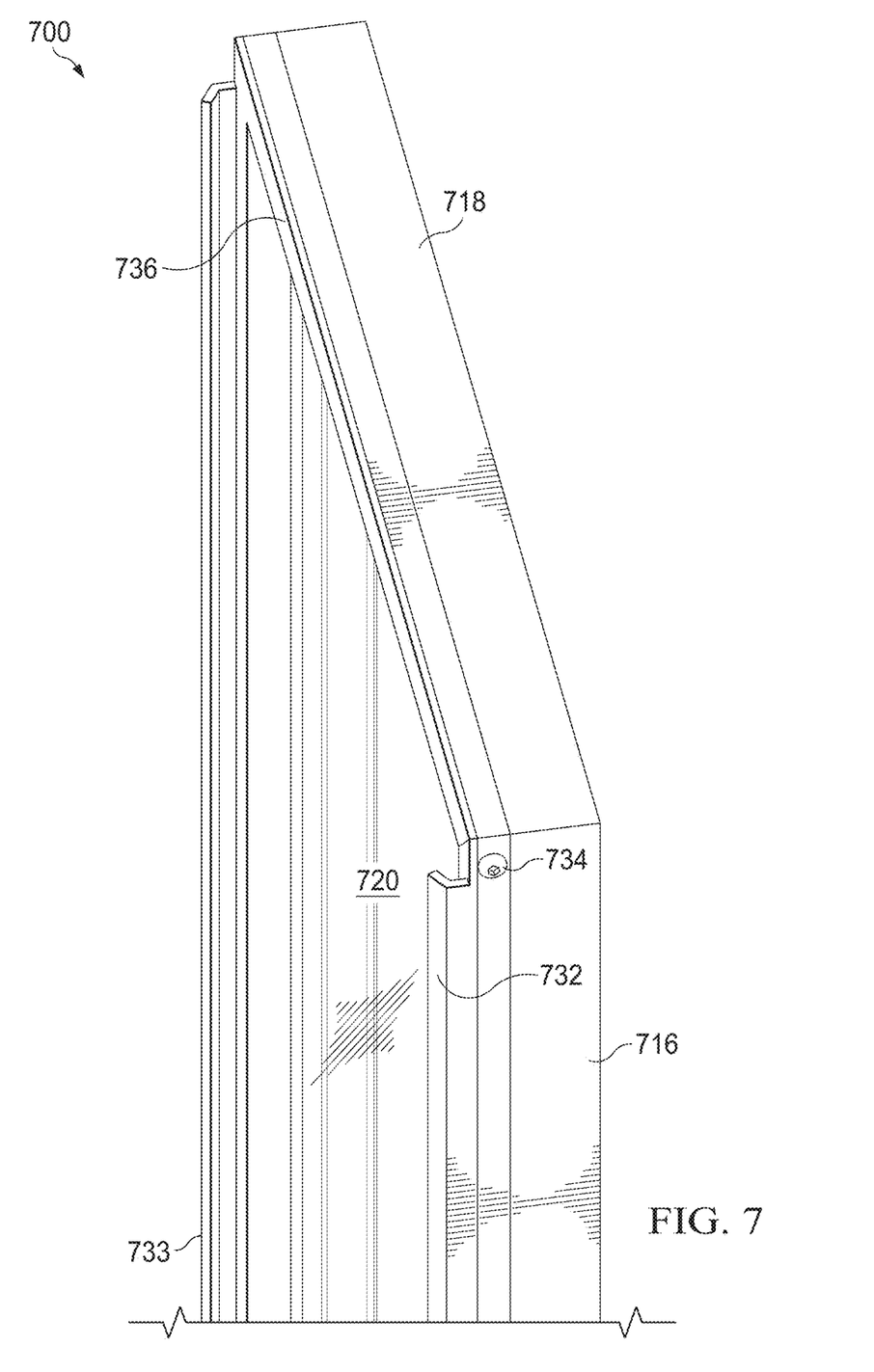
FIG. 7 illustrates a perspective view of a window frame, in accordance with some embodiments of the disclosure.

FIG. 7 illustrates another view of an example embodiment of a window frame 700. A window frame 700 may comprise one or more window frame sides 716, 718, one or more legs 732, 733, a backing portion 736, one or more bolts 734, and/or a window pane 720. One or more legs 732, 733 of a window frame 700 may be comprised on opposite window frame sides 716, 718 (e.g., corresponding to window jambs) and/or one more adjacent window frame sides 716, 718. The one or more legs 732, 733 of a window frame 700 may be engaged with one or more different rails and/or leg insertion cavities (not illustrated in FIG. 7).

Figure 8:
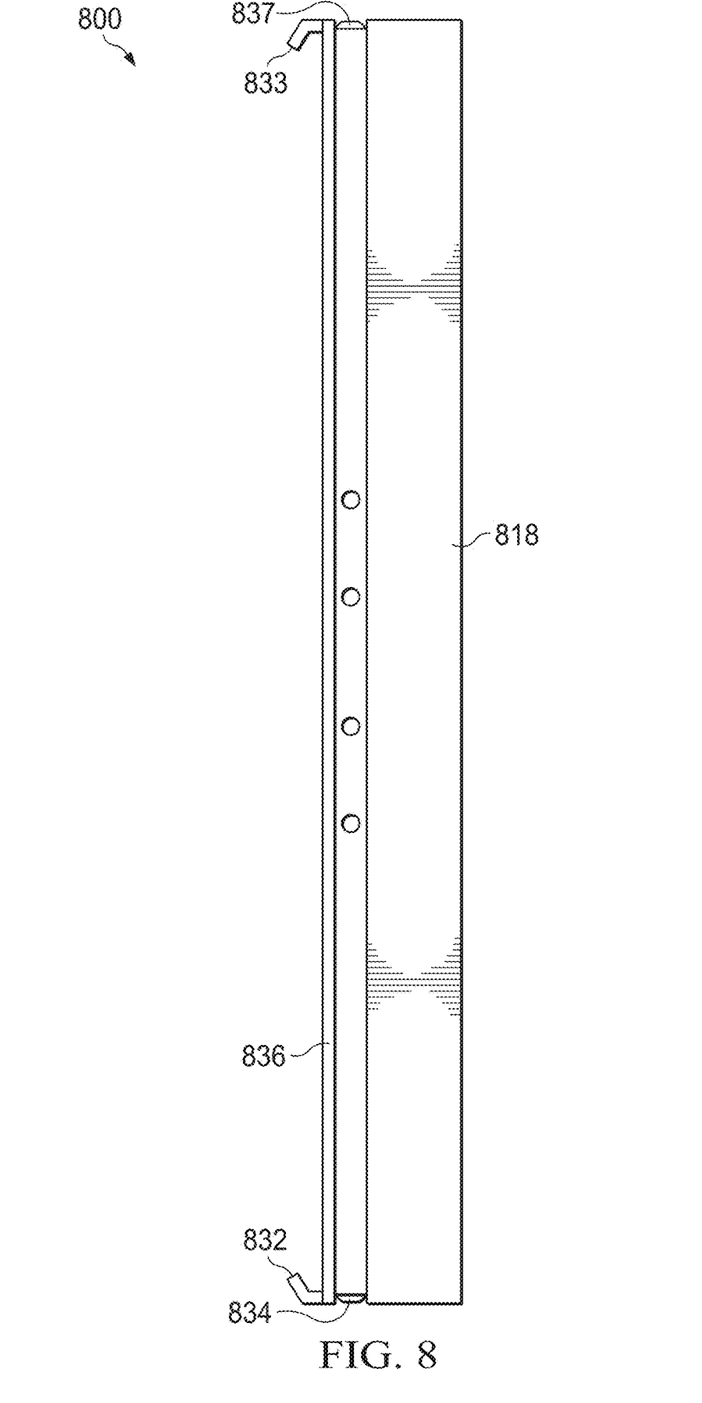
FIG. 8 illustrates a top view of a window frame, in accordance with some embodiments of the disclosure.

FIG. 8 illustrates a top view of an example embodiment of a window frame 800. A window frame 800 may comprise one or more window frame sides 818, one or more legs 832, 833, a backing portion 836, and/or one or more bolts 834, 837.

A top piece, cover, and/or securing piece may be placed and/or secured on top of a rail after insertion and/or engagement of a window frame leg with the rail. The top piece, cover, and/or securing piece may mechanically hold the leg and/or associated window frame in place after assembly. In some embodiments a window frame may comprise other components, such as a window apron. In some embodiments, window frames and/or window panes may be opened, tilted, slid, and/or otherwise positionally and/or rotationally adjusted after the window frames and/or associated window frames are attached to one or more rails (e.g., for aesthetic, visibility, airflow, ventilation, heating, and/or cooling purposes). In some embodiments, a window pane may comprise one or more parallel and/or adjacent panes of glass. Additionally or alternatively, a window frame may comprise one or more parallel window panes (e.g., for insulation, structural integrity, acoustic dampening, and/or wind protection purposes). In some embodiments, a window frame leg may only be inserted along and/or removed along a vertical axis of a rail, rail gasket, leg insertion guide, and/or leg insertion cavity (e.g., such that the vertical axis is substantially parallel to an axis extending from a top portion of the rail to the bottom portion of the rail).

Broadly, the materials used to manufacture the window frame 100 may include one or more rigid or non-rigid materials. Each element and/or sub-element of the window frame described herein may be manufactured from at least one of a rigid material, a non-rigid material, and a plurality of different materials. For example, the window frame may be manufactured from a derivative of an aluminum based alloy in one embodiment, and in other embodiments may be comprised of a range of other alloys whose core component could be copper, zinc, tin, iron, nickel, gold, and/or the like. Additionally and/or alternatively, a synthetic polymer could be used (e.g., high-density polyethylene, low density polyethylene, polypropylene, polyvinyl chloride, polystyrene, polyethylene terephthalate, and/or the like), as well as fiberglass. Window frame material selection may be influenced by geographic location and/or a size or type of structure into which the window frame is to be installed, as well as other factors such as heat index, temperature fluctuations, humidity, precipitation, seismic activity, wind conditions, and/or the like. Like material selection for the window frame, which is discussed non-exhaustively above, glass type selection (whether to use float glass, shatterproof glass, laminated glass, chromatic glass, tinted glass, tempered glass, insulated glass, toughened glass, and/or the like) may depend on several factors such as transparency, strength, workability, transmittance, U-value, color, and/or cost, among other things. Selection may also be based on a desired functionality or utility of the window frame. Geographic location may also play a role in glass type selection due to the impact that temperature fluctuations, humidity, and/or precipitation may have on glass durability, its propensity to contract and/or expand, and/or other factors.

One or more elements of a window frame, rail, and/or gasket railing system may coupled with the use of fasteners and adhesives (e.g., blind fasteners, solid rivets, bolts, self fierce rivets, clinching, flow drill screws, mechanical interlock, electromagnetic formation, and/or the like), soldering (e.g., dip, furnace, induction, infrared, iron, resistance, torch, wave, and/or the like), brazing (e.g., atmosphere, diffusion, dip, furnace, infrared, laser, resistance, torch, and/or the like), solid state welding (e.g., cold, welding, diffusion, explosion, friction, friction stir seam, friction stir spot, magnetic pulse, and/or ultrasonic welding), resistance welding (e.g., resistance spot, weldbonding, resistance seam, projection, high frequency resistance, high frequency induction, flash, upset, and/or pressure welding), and/or via other methods. In other embodiments, ball-point joints, pivot joints, and/or the like may be used to allow for rotational or axial flexibility between elements of the window frame, rail, and/or gasket railing system.

A base may be of a rigid consistency for constructing a stable structure such as a building, a house, and/or the like. In some embodiments, the base may be manufactured from steel, metal, and/or other alloy, wood, plastic, and/or concrete, which comes in a range of varieties (e.g., modern concrete, high-strength concrete, high-performance concrete, ultra high-performance concrete, stamped concrete, self-consolidating concrete, shotcrete, limecrete, vacuum concrete, polymer concrete, pre-stressed concrete, air entrained concrete, and/or the like). While the base may be concrete in some embodiments, the base may also be comprised of a variety of synthetic polymers (e.g., high-density polyethylene, low density polyethylene, polypropylene, polyvinyl chloride, polystyrene, polyethylene terephthalate, and/or the like), different metal alloys (whose major component could be copper, zinc, tin, iron, nickel, gold, and/or the like), lumber (e.g., beech, oak, maple, pine, ash, mahogany, walnut, and/or the like) or lumber composites (e.g., plywood, densified wood, chemically densified wood, fireboard, particle board, oriented strand board, laminated timber, laminated veneer, cross laminated timber, parallel strand lumber, laminated strand lumber, finger joints, beams, trusses, transparent wood composites, and/or the like), and/or any other material. It should be noted that material selection and use may depend on the purported use of an associated window frame system as well as extraneous factors such as geographic location of the window frame system.

Adjacent window frames and/or window frame sides may form a substantially planar arrangement (e.g., on the side of a building or house), and/or may form a substantially curved profile (e.g., on a curved corner of a building). Window frames may be rotationally and/or positionally rigid with respect to the one or more rails they are attached to, and/or window frames may have rotational and/or positional degrees of freedom relative to their rails.

A rail gasket may be comprised of two types of materials, e.g., a soft rubber and a hard plastic. For example, a hard plastic may comprise the core of a rail gasket, while a soft rubber may be limited to an outer contour of the rail gasket. Plastics comprised within one or more rail gaskets may be synthesized from a range of synthetic polymers not limited to high-density polyethylene, polystyrene, or polyethylene terephthalate.

In practice, window frames and/or windows may be used for aesthetics and/or may function as a barrier to the natural elements. Given the flexibility in design and functional breath of a window frame, one or more elements described herein may be utilized in a variety of contexts, including but not limited to commercial buildings, residential buildings, vehicles, steam cars, SUVs, tanks, tractors, aeronautical vehicles, nautical vehicles, boats, ships, containers, tables, all-terrain vehicles, amphibious vehicles, auto rickshaws, cable cars, trolleybus, catamarans, buses, deep submergence vehicles, diving bells, diving chambers, electric vehicles, golf carts, ground effect vehicles, handcars, hoppers, hovercrafts, land yachts, launch escape capsules, locomotives, minibuses, minivans, monorails, passenger cars, race cars, road trains, rockets, rovers, aircraft, screw-propelled vehicles, sea tractors, and/or any other structure or vehicle. Aircraft such as (but not limited to) airships, autogyros, blimps, fixed-wing aircraft, glider aircraft, helicopters, jet aircraft, unmanned aerial vehicles, spacecraft, and/or the like may also benefit from the utilization of embodiments described herein. Other watercraft such as boats, bathyscaphes, yachts, hydrofoils, and/or submarines may also utilize embodiments described herein. Such embodiments may also be utilized in private homes, mobile homes, castles, bungalows, mansions, cottages, condominiums, apartment complexes, manor houses, houseboats, log cabins, villas, yurts, tree homes, farmhouses, duplexes, RVs, shacks, terraced houses, hotels, motels, skyscrapers, restaurants, sports facilities, shopping malls, shops, retail stores, office buildings, serviced offices, industrial warehouses, industrial offices, and/or the like. Similarly, such a window frame design could be used in toy design of each of the vehicles, private homes, and/or commercial buildings outlined above.

Any element described herein may be comprised of any material described herein. Other materials that may be used may be comprised of a variety of synthetic polymers (e.g., high-density polyethylene, low density polyethylene, polypropylene, polyvinyl chloride, polystyrene, polyethylene terephthalate, and/or the like), different metal alloys (whose major component could be copper, zinc, tin, iron, nickel, gold, and/or the like), lumber (e.g., beech, oak, maple, pine, ash, mahogany, walnut, and/or the like) or lumber composites (e.g., plywood, densified wood, chemically densified wood, fireboard, particle board, oriented strand board, laminated timber, laminated veneer, cross laminated timber, parallel strand lumber, laminated strand lumber, finger joints, beams, trusses, transparent wood composites, and/or the like). The window frame 100 described herein may also be used to receive and/or hold solar panels of different varieties including, but not limited to, monocrystalline solar panels, polycrystalline solar panes, thin-film: amorphous silicon solar panels or concentrated PV cell panels.

In considering window design, elements described herein any be applied to single-hung windows, double-hung windows, oriel windows, cottage windows, two-panel slider windows, three-panel slider windows, picture windows, deadlites, hopper windows, casement windows, transoms windows, jalousie windows, garden style windows, glass block windows, storm windows, egress windows, skylight windows, round windows, arched windows, awning windows, picture windows, transom windows, sliding windows, stationary windows, bay windows, bow windows, and/or any other type of window.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages. Any component of any system may be combined with any component of any other system (and/or the same system). Any step of any method and/or process may be combined with any other step (or a same step) of any other (or same) method and/or process. Any system operable to realize a described method or process could be used. A described system could be configured to carry out any method, step, and/or procedure which the system is operable to carry out.

Various terms used herein have special meanings within the present technical field. Whether a particular term should be construed as such a "term of art," depends on the context in which that term is used. "Connected to" or other similar terms should generally be construed broadly to include situations where connections are direct between referenced elements or through one or more intermediaries between the referenced elements. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, any section headings provided herein are for consistency with the suggestions under 37 C.F.R. 1.77 or otherwise to provide organizational cues. These headings shall not limit or characterize the implementations set out in any claims that may issue from this disclosure. Specifically and by way of example, although the headings may refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Additionally, although similar reference numbers may be used to refer to similar elements for convenience, it can be appreciated that each of the various example implementations may be considered distinct variations.

Each disclosed method and method step may be performed in association with any other disclosed method or method step and in any order according to some embodiments. Where the auxiliary verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, devices, methods, and method steps not recited may be included or excluded as desired or required. Persons skilled in the art may make various changes in methods of preparing and using a device and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

The title, abstract, background, and headings are provided in compliance with regulations and/or for the convenience of the reader. They include no admissions as to the scope and content of prior art and no limitations applicable to all disclosed embodiments.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

All of the compositions and/or methods disclosed and claimed herein can be made and executed without undue experimentation in light of the present disclosure. While the compositions and methods of this disclosure include preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A gasket railing system comprising a rail, the rail comprising:
   a rail gasket at least partially disposed within the rail;
   a leg insertion guide disposed within the rail gasket, the leg insertion guide forming a leg insertion cavity configured to receive a window frame leg,
     wherein the rail gasket comprises a pliable material, and
     wherein the leg insertion guide comprises a rigid material; and
   a second leg insertion guide disposed within the rail gasket, the second leg insertion guide forming a second leg insertion cavity configured to receive a second window frame leg, and wherein the second leg insertion guide comprises the rigid material.

2. The gasket railing system of claim 1, wherein the pliable material comprises at least one of rubber and silicone.

3. The gasket railing system of claim 1, wherein the rigid material comprises at least one of nylon, acrylic, polyethylene, polypropylene, and polycarbonate.

4. The gasket railing system of claim 1, wherein the leg insertion cavity comprises a second cross-section complementary to a first cross-section comprised in the window frame leg.

5. The gasket railing system of claim 4, wherein the first cross-section is a horizontal cross-section of the window frame leg, and wherein the second cross-section is a horizontal cross-section of the leg insertion cavity.

6. The gasket railing system of claim 1, wherein the leg insertion cavity is configured to receive the window frame leg at a top end of the rail.

7. The gasket railing system of claim 4, wherein the second cross-section is a horizontal cross-section of the leg insertion cavity, and wherein the second cross-section is constant along the vertical length of the leg insertion cavity.

8. The gasket railing system of claim 1, further comprising a leg stop disposed at a bottom end of the rail, wherein the leg stop is configured to limit the downward vertical movement of the window frame leg from a top end of the rail to the bottom end of the rail.

9. The gasket railing system of claim 4, wherein the leg insertion cavity is configured to prevent the window frame leg from being inserted into and removed from an outward facing side of the leg insertion cavity, such that the window frame leg can only be inserted and removed along a vertical axis of the leg insertion cavity.

10. The gasket railing system of claim 1, wherein the window frame leg is connected to a first window frame, wherein the second window frame leg is connected to a second window frame, and wherein the first window frame and the second window frame are adjacent after a first insertion of the window frame leg into the leg insertion cavity and a second insertion of the second window frame leg into the second leg insertion cavity.

11. The gasket railing system of claim 8, wherein a bottom portion of the rail is attached to a base, and wherein the leg stop prevents contact between a window frame connected to the window frame leg and the base during insertion of the window frame leg into the leg insertion cavity.

12. An assembly comprising a window frame and a rail, comprising:
   four window frame sides;
   a window pane fully encased within the four window frame sides;
   a rail gasket at least partially comprised in the rail;
   a leg insertion guide comprised in the rail gasket, the leg insertion guide forming a leg insertion cavity configured to receive a window frame leg, wherein the leg insertion guide comprises a rigid material; and
   a second leg insertion guide comprised in the rail gasket, the second leg insertion guide forming a second leg insertion cavity configured to receive a second window frame leg, wherein the second leg insertion guide comprises the rigid material.

13. The assembly of claim 12, wherein the four window frame sides comprise aluminum.

14. The assembly of claim 12, wherein the window frame leg or the second window frame leg comprises aluminum.

15. The assembly of claim 12, wherein the rail gasket is made of a pliable material.

16. The assembly of claim 12, further comprising at least one screw connecting a first window frame side and a second window frame side.

17. The assembly of claim 16, wherein a third window frame side substantially parallel to the first window frame side comprises a leg configured to be received by a third leg insertion cavity comprised in a second rail.

18. The assembly of claim 12, further comprising a compressible backing portion disposed between the four window frame sides and the rail, after insertion of the window frame leg or the second window frame leg into the leg insertion cavity or the second leg insertion cavity, respectively, comprised in the rail.

19. The assembly of claim 12, wherein an outer vertical edge of a first window frame side is positioned at a substantially horizontal midway point of the rail after insertion of the window frame leg or the second window frame leg into the leg insertion cavity or the second leg insertion cavity, respectively, comprised in the rail.

* * * * *